United States Patent
Shailendra et al.

(10) Patent No.: US 9,781,033 B2
(45) Date of Patent: Oct. 3, 2017

(54) PROVIDING REQUESTED CONTENT IN AN OVERLAY INFORMATION CENTRIC NETWORKING (O-ICN) ARCHITECTURE

(71) Applicant: TATA CONSULTANCY SERVICES LIMITED, Mumbai (IN)

(72) Inventors: Samar Shailendra, Bangalore (IN); Bighnaraj Panigrahi, Bangalore (IN); Hemant Kumar Rath, Bangalore (IN); Anantha Simha, Bangalore (IN)

(73) Assignee: TATA CONSULTANCY SERVICES LIMITED, Mumbai (IN)

(*) Notice: Subject to any disclaimer, the term of this patent is extended or adjusted under 35 U.S.C. 154(b) by 204 days.

(21) Appl. No.: 14/693,949

(22) Filed: Apr. 23, 2015

(65) Prior Publication Data
US 2016/0173374 A1  Jun. 16, 2016

(30) Foreign Application Priority Data
Dec. 12, 2014 (IN) .......................... 4003/MUM/2014

(51) Int. Cl.
| | |
|---|---|
| *G06F 15/173* | (2006.01) |
| *H04L 12/741* | (2013.01) |
| *H04L 29/08* | (2006.01) |
| *H04L 29/06* | (2006.01) |
| *H04L 12/715* | (2013.01) |

(52) U.S. Cl.
CPC ............ *H04L 45/74* (2013.01); *H04L 67/327* (2013.01); *H04L 69/22* (2013.01); *H04L 45/04* (2013.01)

(58) Field of Classification Search
CPC ....... H04L 45/04; H04L 45/74; H04L 67/327; H04L 69/22
See application file for complete search history.

(56) References Cited

U.S. PATENT DOCUMENTS

| | | |
|---|---|---|
| 2013/0332619 A1 | 12/2013 | Xie et al. |
| 2014/0020102 A1 | 1/2014 | Srinivasan et al. |
| 2014/0173018 A1 | 6/2014 | Westphal et al. |
| 2014/0192717 A1 | 7/2014 | Liu et al. |
| 2016/0197831 A1* | 7/2016 | De Foy ............... H04L 45/7453 370/392 |

OTHER PUBLICATIONS

IEEE article An OpenFlow-based Testbed for Information Centric Networking (2012) to Blefari-Melazzi et al. ("Blefari-Melazzi").*

(Continued)

*Primary Examiner* — June Sison
(74) *Attorney, Agent, or Firm* — Hamre, Schumann, Mueller & Larson, P.C.

(57) ABSTRACT

Methods and systems for providing requested content to a user device in an Overlay Information Centric Network (O-ICN) architecture are disclosed herein. The method may include receiving a request for accessing content, from the user device. The request is routed to the ICN manager from an ICN router. The method may also include parsing the request to determine whether the request is an ICN based request. The ICN-based request is associated with a flag. Further, the method includes based on the determination, identifying at least one network entity hosting the requested content. The identification is based on a name of the content. The method also includes sending a notification to the at least one identified network entity for providing the requested content to the user device.

14 Claims, 5 Drawing Sheets

(56) References Cited

OTHER PUBLICATIONS

Internet draft "IP protocol suite extensions to support CONET information centric networking" (Jun. 20, 2013) to Detti et al. ("Detti").*

Article "Network of Information (NetInf)—an information-centric networking" (Jan. 27, 2013) to Dannewitz et al. ("Dannewitz").*

* cited by examiner

US 9,781,033 B2

PROVIDING REQUESTED CONTENT IN AN OVERLAY INFORMATION CENTRIC NETWORKING (O-ICN) ARCHITECTURE

TECHNICAL FIELD

The present subject matter relates, in general, to information centric networking and in particular, to providing requested content in an overlay information centric networking architecture.

BACKGROUND

Currently, the Internet is primarily a point-to-point or host-to-host network where information is identified by its location on the network. The increasing demand for scalable and efficient distribution of content has led to the development of future Internet architectures, such as Information Centric Networks (ICNs) and Software Defined Networks (SDNs). SDN decouples control plane from data plane, which decides where and how the traffic is to be sent and the data plane forwards the traffic to a destination. In ICN, communication is not based on host-to-host communication. Instead, requesters may send requests to a network, requesting for the content without mentioning its location. Further, in ICN, along with a source of the content, the content is also cached at local routers to deliver the content to the user either from the source and/or from the local routers.

BRIEF DESCRIPTION OF THE DRAWINGS

The detailed description is provided with reference to the accompanying figures. In the figures, the left-most digit(s) of a reference number identifies the figure in which the reference number first appears. The same numbers are used throughout the figures to reference like features and components. Some embodiments of system and/or methods, in accordance with embodiments of the present subject matter, are now described by way of example only, and with reference to the accompanying figures, in which:

FIG. 1(*b*) illustrates an Overlay Information Centric Networking (O-ICN) architecture implementing a router and a network controller, in accordance with an implementation of the present subject matter.

FIG. 1(*c*) illustrates ICN sub-layer header fields, in accordance with an implementation of the present subject matter.

DETAILED DESCRIPTION

Figure 1A:
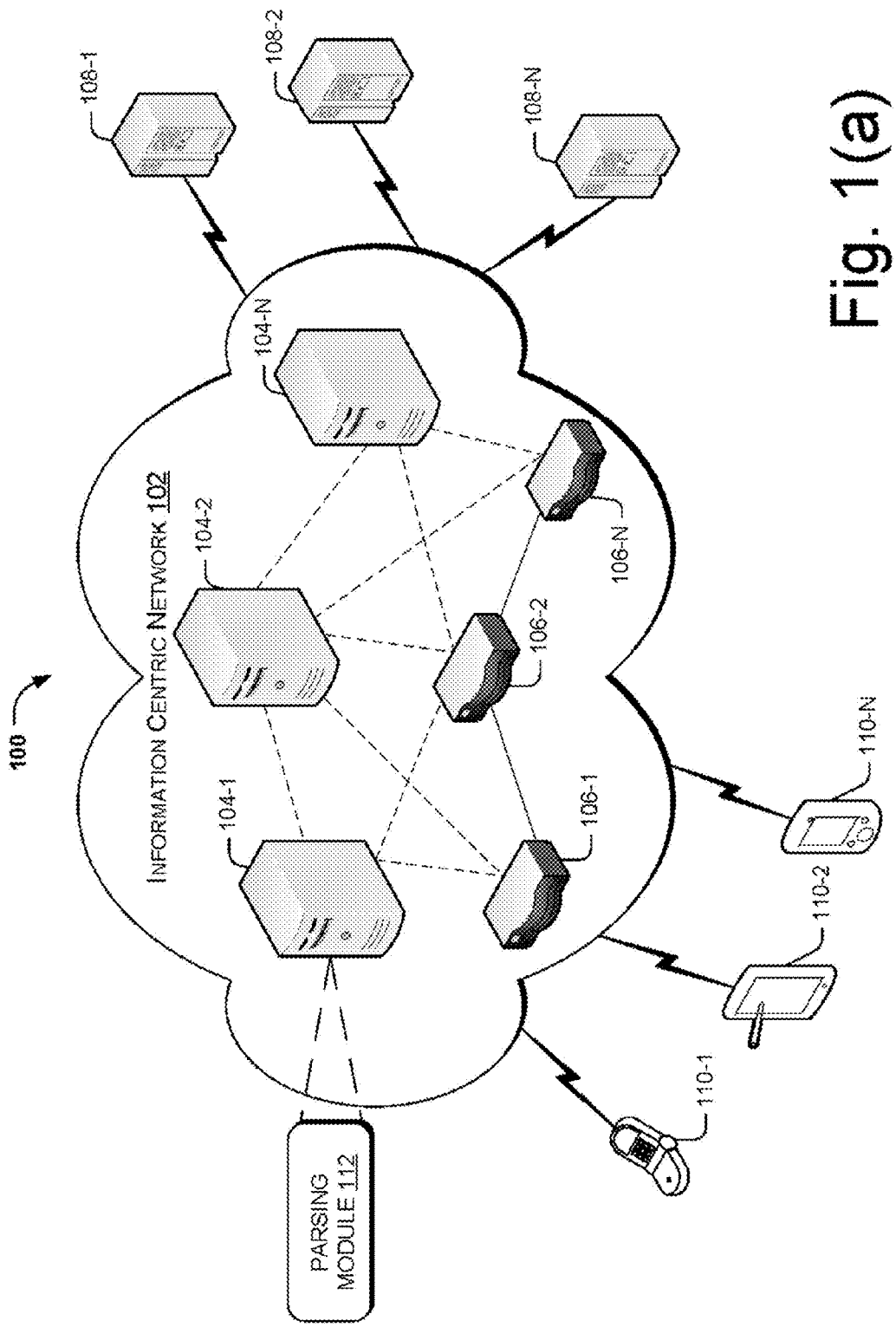
FIG. 1(*a*) illustrates an Overlay Information Centric Networking (O-ICN) architecture, in accordance with an implementation of the present subject matter.

Internet was designed to serve communication between two nodes. Networking technologies are therefore based on a device-centric paradigm, focusing on interconnection of devices, such as computers, mobile devices, servers, and routers. In existing technologies, the communicated information, for example, web pages, music, videos, or computer software, is largely anonymous when transferred over the network. This anonymity makes it inconvenient to distribute information in an efficient manner. Moreover, due to the host-to-host nature of the Internet, same contents are being transmitted over same and other communication links redundantly which causes wastage of network resources, such as bandwidth and also degrades quality of service. Existing solutions merely attempts to improve the quality of service by providing more bandwidth and computational resources without addressing the issue of redundant content transfer within the network.

To address optimization concerns of the Internet, Software Defined Networking (SDN) was proposed. SDN may be understood as an Internet Protocol (IP) network that utilizes Transmission Control Protocol/Internet Protocol (TCP/IP) protocols. SDN may be understood as a network architecture that decouples the control plane from data plane in the architecture. The control plane administers internal device operations and provides instructions to direct data packets. The SDN moves the control plane to an SDN controller. On the other hand, network nodes that support SDN may be configured to implement the data plane functions. However, as SDN is based on host-to-host concept, the deficiencies of the Internet still persist in the SDNs.

In recent years, Information Centric Networking (ICN) has emerged as a promising future Internet architecture to handle ever increasing demand of data and to obviate repeated transmission of the contents. The ICN shifts the communication model from current host-to-host model, e.g., the Internet model, to content name model. In ICN, the content is exchanged based upon a name of the content without knowledge of its location in the network. In ICN, along with the source, the content is also cached at local routers. Therefore, for future requests, the content is delivered to the user from the local routers instead of contacting the source for each request.

In the Internet today, huge amount of content is existing and naming each and every content differently for efficiently addressing the content is a huge challenge. Moreover, establishing the integrity as well as the authenticity of the content and the source of content is also a challenging issue to be addressed. Moreover, for next several years, both legacy networks and Software Defined Networks may co-exist. Therefore, the ICNs are expected to be implementable in SDN as well as in the legacy networks.

Also, in order to deploy any of the above-proposed architectures, significant changes are to be made in the existing Internet. For example, network elements, user devices, content sources as well as other intermediary network elements have to be completely replaced or significantly modified to deploy the proposed architectures. Completely replacing the existing Internet is a cumbersome task and is not feasible.

According to an embodiment of the present subject matter, systems and methods for providing requested content to a user in an overlay information centric networking (O-ICN) architecture are disclosed. The O-ICN architecture may support both software defined networks (SDNs) and non-SDN networks or legacy networks. In an implementation, the O-ICN architecture may be implemented as an overlay network over the Internet and may be deployed incrementally without impacting functionalities of the Internet. In an implementation, the O-ICN architecture may be added as an ICN sub-layer at the top of the transport layer of the TCP/IP protocol stack. The O-ICN may segregate various control plane activities from that of data plane activities. In an example, the control plane activities may include, but are not limited to, naming, name resolution, and routing. In another example, the data plane activities may include, but are not limited to, forwarding, storing, and caching of ICN contents. The control plane may be responsible for intelligence and policy making aspects of the architecture.

In an implementation, the control plane activities, as mentioned above, may be handled by one or more ICN managers to facilitate in managing seamless flow of content across the O-ICN architecture. For example, the ICN managers may be provided with name resolution and routing capabilities. In an example, the ICN manager may include details about various network entities. The details may include, but are not limited to, Internet Protocol (IP) addresses of the network entities and information about the content stored in the network entities. In other words, the ICN manager may maintain a record of the content being hosted by each of the plurality of network entities.

Further, the data plane activities may be handled by one or more ICN routers. In an implementation, the ICN routers may be understood as standard routers that may be patched to communicate with the ICN managers. In an example, a network administrator may select the routers for being patched with the ICN managers. Further, the ICN routers may be provided with extra storage and may be patched to cache the contents for serving subsequent requests for same content. In an example, the caching is performed based on a plurality of parameters. The parameters may include, but are not limited to, frequency of reuse of content, resource availability, serving delay constraints, and life of the content. In the present implementation, the routers may receive requests from users for accessing the content. The routers may be configured to identify whether the request received from a user device has to be processed using standard TCP/IP mechanisms or has to be routed to the ICN manager.

In an example, the user device has to be aware of the overlay network as provided by the ICN architecture. If the user device is not aware of the overlay network, the user device may be unable to send ICN based requests. In an implementation, the ICN sub-layer may be added as an additional header along with existing domain name system (DNS). For example, an ICN based request may be associated with a flag in a reserved bit of a header of the request to indicate that the request is the ICN based request. Further, QNAME field of DNS packet header and URL field of the HTTP field may be modified to accommodate ICN requests so that the ICN subfield may be read by the ICN managers.

In case the user device is aware of the overlay network, a user may either send an ICN based request or a standard request to the network. As may be understood, the ICN based request includes name of the content rather than location of the content. In case the requests are non-ICN based, QNAME field of the DNS packet header and the URL field of the HTTP field will continue to have their usual meanings. If an ICN enabled user sends an ICN request to a non-ICN enabled router or DNS server, such a request may be discarded by the corresponding router or the DNS server. In such a scenario, the ICN application may be built with a mechanism to fall back to traditional approach of host-to-host communication.

In use, the ICN router may receive a content request from a user device. The ICN router may parse the request to determine whether a flag is associated with a reserved bit of a header of the request or not. If the flag is associated, the request may be understood as the ICN based request. If the flag is not associated with the request, the ICN router may process the request as a standard request through TCP/IP mechanism. For example, the standard request may include an IP address of a source of the content or a network entity hosting the content. Accordingly, the ICN router may share the request with the network entity.

In case of the ICN based request, the ICN router may forward the request to the ICN manager for providing the content to the user device. The ICN manager may parse the request to identify a name of the content as requested by the user device. Upon identifying the name, the ICN manager may compare the name with the content stored at the plurality of network entities to identify at least one network entity hosting the requested content. In an example, the requested content may be hosted by a single network entity or multiple network entities. For example, some part of the requested content may be available with the ICN router and remaining content may be stored at another server.

In one implementation, the ICN manager may communicate with other ICN managers that may be placed at a higher level in the hierarchy to determine a source of the requested content. In another implementation, the ICN manager may communicate with neighboring ICN managers, such as through peer-to-peer connection, to determine the at least one network entity hosting the requested content. Upon identifying the at least one network entity, the ICN manager may send a notification to the identified network entities instructing them to share the requested content with the user device. In an implementation, the notification may include the IP address of the user device such that the network entities hosting the content may directly provide the requested content to the user device.

In an implementation, the ICN architecture may be implemented in an SDN enabled network. In an example, functionalities of the ICN managers may be merged with SDN controllers. In an alternative example, the ICN managers may be provided separate from the SDN controllers. In this scenario, the ICN managers may communicate with the SDN controllers by using SDNi. The SDNi may be understood as a communication link defined for communication amongst SDN controllers. Accordingly, the ICN managers may be configured to support the SDNi for interoperability between ICN and SDN networks. Further, routers in the SDN may be provided with an optional caching capability to implement ICN architecture.

Thus, the present subject matter provides an ICN architecture that may coexist in both SDN and non-SDN implementations. Accordingly, the present subject matter may facilitate in optimized resource utilization within the network. The ICN architecture may be deployed incrementally over the Internet as some of the existing routers are made ICN enabled. Further, the ICN architecture as described in the present subject matter facilitates seamless operation between both SDN and non-SDN networks.

While aspects of described system(s) and method(s) of providing requested content in an information centric networking architecture can be implemented in any number of different computing devices, environments, and/or configurations, the implementations are described in the context of the following example system(s) and method(s).

Figure 1B:
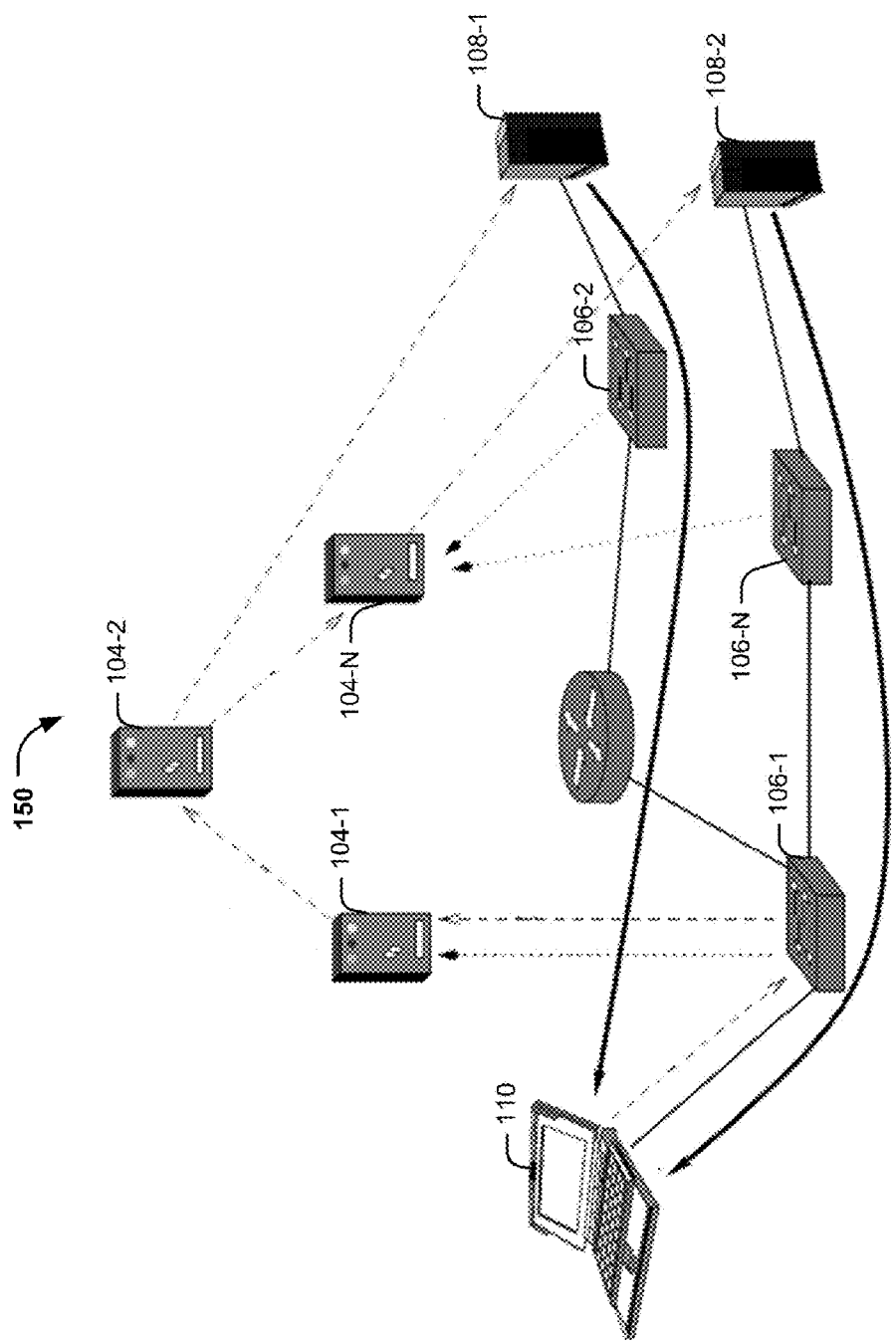
Figure 1C:
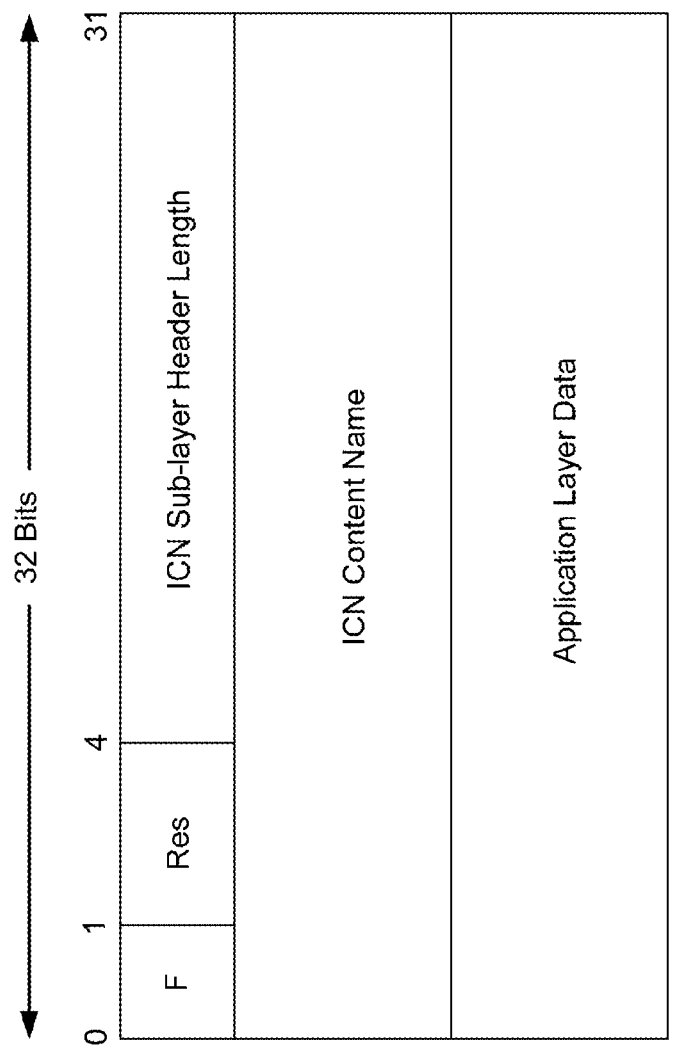

FIG. 1 illustrates a network environment 100 configured to provide content as requested by different users in an overlay information centric network (O-ICN), in accordance with an embodiment of the present subject matter. In said embodiment, the network environment 100 may include the O-ICN 102 including a plurality of controllers, such as ICN managers 104-1, 104-2 . . . 104-N collectively referred to as ICN managers 104 and individually referred to as ICN manager 104. The ICN managers 104 may be understood as a network entity that may have control over a set of network resources in a data plane. In an example, the ICN managers 104 may maintain a synchronized record of content hosted by different network entities in the O-ICN 102. In an implementation, existing DNS servers may be patched to support ICN functionalities of the ICN managers 104. For example, the ICN functionalities may include ICN name resolution, routing, and management. The ICN managers 104 may be deployed in a distributed or in a centralized or in a hybrid manner depending upon the Internet Service Providers (ISP).

Further, the O-ICN 102 may include a plurality of routers, such as routers 106-1, 106-2 . . . 106-N collectively referred to as routers 106 and individually referred to as router 106. In said embodiment, some of the routers 106 may be provided patched by a network administrator to provide additional capabilities to the routers 106. For example, the routers 106 may be provided with extra storage to cache the contents passing through the routers 106. Further, the routers 106 may be patched to communicate with the ICN managers 104. Such routers are hereinafter referred to as ICN router 106. The ICN routers 106 may be able to extract and read at least up to the ICN sub-layer.

The ICN routers 106 may be configured to process requests that may be received from users for accessing the content. The ICN routers 106 may employ a cache replacement policy if the cache is full. For example, the cache replacement policies may include, but are not limited to, Least Recently Used (LRU), Least Frequently Used (LFU), and First In First Out (FIFO). The cache replacement policy may facilitate the ICN router 106 to decide further course of action when the cache of the ICN router 106 is full and the ICN router 106 has to cache more content.

Every time there is any change in the content stored in the cache of the ICN routers 106, the corresponding changes are reported to the ICN managers 104. In an alternative approach, the ICN router 106 may maintain a table containing information about the content that is cached by the ICN router 106. The cached content may be shared with the ICN manager 104, when the ICN manager 104 demands for it. In an implementation, all content is associated with a lifetime after which the content expires. In order to maintain active content in the cache, the ICN router 106 may periodically synchronize the content with a source of the content. In an example, the ICN router 106 may periodically contact the source of the content, such as an ICN server, and retrieve new content for caching. In another example, the ICN router 106 may drop the expired content and based on a request, fetch the content from the source of the content.

The network environment 100 may further include a plurality of data stores, such as data stores 108-1, 108-2 . . . 108-N collectively referred to as data stores 108 and individually referred to as data store 108. The data stores 108 may store collection of content, such as files, images, videos, and the like. Accordingly, the ICN managers 104 and the ICN routers 106 may communicate with the data stores 108 to provide the content to different users. Further, the network environment 100 may include one or more user devices 110-1, 110-2, . . . , and 110-N collectively referred to as user devices 110 and individually referred to as a user device 110 hereinafter. Examples of the user devices 110 may include, without limitation, desktop computers, hand-held devices, laptops or other portable computers, network computers, mobile phones, landline phones, and the like.

In an implementation, the user devices 110 may or may not be aware of the O-ICN 102. Accordingly, the user devices 110 may be unable to send ICN based requests for accessing content. An ICN based request may be understood as a request based on a name of the content rather than on a location of the content. In order to do so, the user devices 110 may have to modify a Transmission Control Protocol (TCP) option field in order to send the ICN based requests. In an example, to send the ICN based request, a user device 110 may have to set a flag in a header of the request. Specifically, the flag may be set in a reserved bit of the header to indicate that the request is an ICN based request. If the user device 110 sends the request without setting the flag, the request may be processed through standard mechanism of peer-to-peer connection.

In operation, the user device 110 may send a request through the TCP for accessing the content to the O-ICN 102. In the O-ICN 102, the request may be received by the ICN router 106 connected to the user device 110. The ICN router 106 may forward the request received from the user device 110 to the ICN manager 104 associated therewith. In an implementation, the ICN manager 104 may include a parsing module 112 to determine whether or not the request is an ICN based request or a standard request. Therefore, the parsing module 112 may parse a header field of the request to identify if a flag is associated with a reserved bit of the header field of the request. In an example, out of the three reserved bits in TCP, one reserved bit is associated with a flag to indicate that the request is the ICN based request. If there is no flag associated with the reserved bits, the parsing module 112 may route the request using standard routing mechanism which includes establishing peer-to-peer connection for data transfer.

Further, the ICN manager 104 may, based on the ICN based request, determine at least one network entity that may be hosting the requested content. In an example, the ICN manager 104 may determine the at least one entity based on a name of the content as requested by the user device 110. As mentioned above, the ICN manager 104 maintains a record of the content being hosted by different network entities, the ICN manager 104 may compare the name of the content with each of the plurality of network entities to identify the at least one network entity hosting the requested content. In an example, the ICN managers 104 may follow a hierarchical structure, i.e., if the ICN manager 104 is not able to resolve the name of the requested content it will contact another ICN manager 104 which is at a higher hierarchical level. In another implementation, the ICN manager 104 may communicate with neighboring ICN managers, such as through peer-to-peer connection, to determine the at least one network entity hosting the requested content. The search for the requested content is carried on between the ICN managers 104 till the requested content is found.

Once the network entity is identified, the ICN manager 104 may send a notification to the identified network entity to provide the requested content to the user device 110. In an example, the ICN manager 104 may share an Internet Protocol (IP) address of the user device 110 with the identified network entity for providing the requested content directly to the user device 110. In an example, the requested content may be stored at the data store 108 or at the ICN router 106. In an alternative example, part of the requested content may be stored at the data store 108 and remaining part of the requested content may be stored at a cache of the ICN router 106.

In an embodiment, the O-ICN 102 as described above may co-exist with a Software Defined Network (SDN). To enable deployment of the O-ICN 102 in the SDN, the functionalities of the ICN managers 104 may be merged with that of SDN controllers (not shown). In such a scenario, switches pertaining to the SDN may communicate with corresponding SDN controllers for routing of the request. The SDN controllers may then be performing the functions as described above with respect to ICN manager 104. In an implementation, the SDN controllers may be provided separate from the ICN managers 104. In such case, the SDN controllers and the ICN managers 104 may support inter-controller communication protocols, such as Border Gateway Protocol (BGP) and SDNi. In addition, the SDN switches may be patched to have caching capability to enable deployment of the O-ICN 102 in the SDN.

In another embodiment, the O-ICN 102 may be implemented both in SDN and non-SDN networks, such as a legacy network. Considering a scenario, where the user device 110 is in the SDN and the data source 108 is in the non-SDN network which implements the O-ICN 102. When the user device 110 sends a request for accessing the content, an SDN controller may communicate with the ICN manager 104 through the inter-controller communication protocols, to identify one or more network entities that hosts the requested content. Upon identification, the ICN manager 104 may send a notification to the one or more identified network entities for sharing the requested content with the user device 110.

Accordingly, the present subject matter may facilitate in optimized resource utilization within the network. The O-ICN 102 may be deployed incrementally over the Internet as some of the existing routers are made ICN enabled. Further, the O-ICN 102 facilitates seamless transfer of content between both SDN and non-SDN networks.

Referring to FIG. 1(*b*), an Overlay Information Centric Networking (O-ICN) architecture 150 is illustrated, in accordance with an implementation of the present subject matter. As mentioned above, the O-ICN architecture 150 includes a control plane segregated from a data plane. The ICN managers 104 as described with reference to FIG. 1(*a*) will be responsible for various activities pertaining to the control plane. In an implementation, the ICN managers 104 are merged with existing DNS servers. Further, the ICN managers 104 are configured to handle both ICN based and non-ICN based requests. An ICN based request may be understood as a request that names the content itself via location independent Object Identifiers. In the present implementation, the ICN names may be resolved by the ICN managers 104. On the other hand, the existing Internet names or non-ICN based requests may be resolved by the existing DNS servers.

Further, the O-ICN architecture 150 may include sources of the content as requested by the user device 110. In an example, there may be two types of sources, such as ICN routers 106 and data stores 108, such as ICN servers. The ICN servers 108 may be understood as a permanent source of the content or content originator. On the other hand, the ICN routers 106 may be understood as temporary sources of the content. As the ICN routers 106 may read the ICN sub-layer, the ICN routers 106 may cache the contents passing through it.

As may be seen in the FIG. 1(*b*), the user device 110 may share the request for accessing content with the ICN router 106 connected to the user device 110. Upon receiving the request, the ICN router 106 may forward the request to an ICN manager 104 that may be associated with the ICN router 106. Upon receiving the request, the ICN manager 104 may first determine whether the request is an ICN based request or a non-ICN based request. To do so, the ICN manager 104 may parse a header field of the request to identify whether a reserved flag bit is associated with the TCP header field is set to 1 or not. In an implementation, any one of the two reserved flag bits of TCP/IP header can be used to distinguish between ICN and non-ICN packets. Details about the ICN sub-layer header fields are described in conjunction with FIG. 1(*c*). Further, if the requests (which are either similar to DNS or HTTP requests) are of ICN type, then the ICN manager 104 may determine whether QNAME field of DNS packet header or the URL field of the HTTP request header are padded with zero or not. If padded with zero, then the ICN Manager 104 assumes these requests as ICN requests and look for the requested content name as available in the ICN sub-layer which is placed between the Application layer and the Transport layer.

In case of new request types/applications other than DNS and HTTP in the future, then the TCP/IP header has to be changed appropriately by setting one of the reserved flag bits to 1. In case of a non-ICN based request, the ICN manager 104 may resolve an IP address as may be indicated in the request sent by the user device 110. The ICN manager 104 may thereafter process the request as per the existing techniques and send it back to the ICN router 106. The ICN router 106 may forward the TCP/IP packet received from the user device 110 to a destination as indicated in the request.

Further, in case of the ICN-based request, the ICN manager 104 may determine the at least one network entity hosting the requested content. In an implementation, the ICN managers 104 may follow a hierarchical structure, i.e., if the ICN manager 104 is not able to resolve the name of the requested content it will contact another ICN manager 104 which is at a higher hierarchical level. In another implementation, the ICN manager 104 may communicate with neighboring ICN managers, such as through peer-to-peer connection, to determine the at least one network entity hosting the requested content. The search for the requested content is carried on between the ICN managers 104 till the requested content is found.

Once, the network entity hosting the requested content is identified, the ICN manager 104 may share the IP address of the user device 110 with the at least one network entity to provide the requested content to the user device 110. In another implementation, if the ICN manager 104 is unable to locate a source of the requested content, the ICN manager 104 may communicate with neighboring ICN managers to identify the at least one network entity hosting the requested content.

Further, in order to distinguish ICN content from non-ICN content, the at least one network entity hosting the requested content may utilize one of the two reserved bits of the TCP header. For example, the network entity acting as the source of the content may have to set one of the two reserved bits to 1 while sending the content to the user device 110. In an implementation, if the 1$^{st}$ reserved bit is set to 1, the ICN routers 106 may check the ICN sub-layer and cache the content. Further, while sharing the requested content, the ICN server 108 may modify the ICN sub-layer header fields. Description about the ICN sub-layer header fields are described in conjunction with FIG. 1(*c*).

Referring to FIG. 1(*c*), different fields of the ICN sub-layer header are illustrated, in accordance with an embodiment of the present subject matter. The first bit in the header indicates an ICN flag bit. In an example, while sending a request, the user device 110 may set the first bit to 0 for an ICN-based request and to 1 for ICN based content or data. Further, three subsequent bits of the ICN sub-layer header are reserved for future use. The next 28 bits of the ICN sub-layer indicate a total length of the ICN header which includes both ICN sub-layer header length as well as ICN content name field. This field may point to the name with ($2^{20}$–32) characters, if the characters are ASCII encoded. In an example, the length of the ICN content name field is a multiple of 32-bits. If length of the ICN content name is not a multiple of 32-bits, then the name field is padded with some pre-defined characters or null characters to align it to the chunk boundary of multiple 32-bits.

Figure 2:
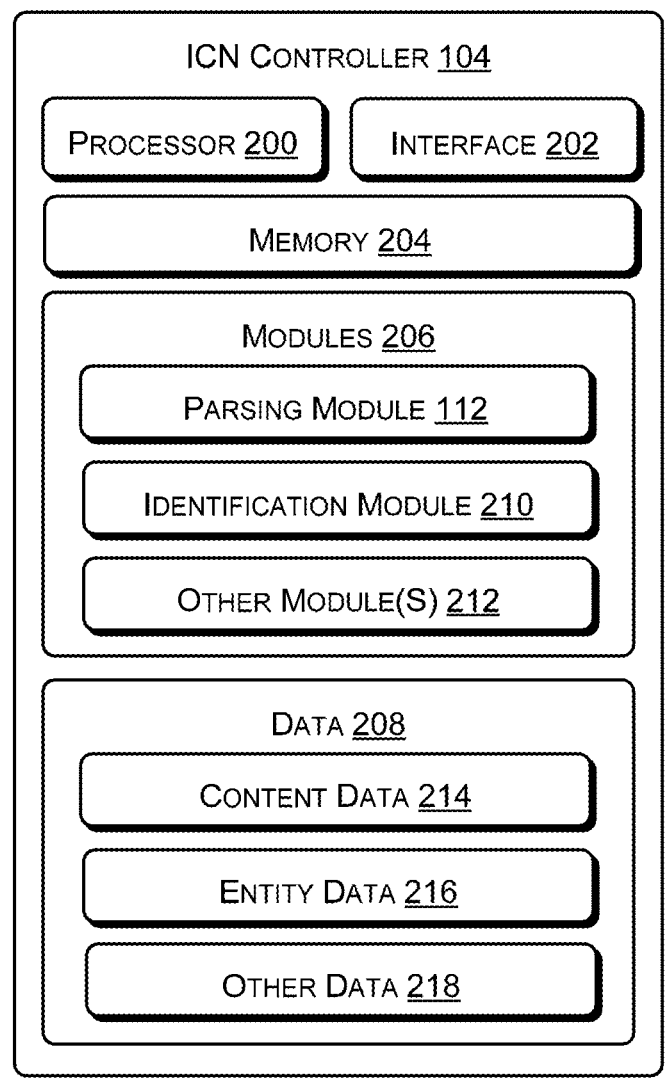
FIG. 2 schematically illustrates a network controller providing the requested content to a user device in an Overlay information Centric Networking (O-ICN) architecture, in accordance with an embodiment of the present subject matter

FIG. 2 schematically illustrates an ICN manager 104 for providing the requested content to a user device 110 in the O-ICN 102, according to an embodiment of the present subject matter. In one implementation, the ICN manager 104 may include one or more processor(s) 200, interface(s) 202, and a memory 204, coupled to the processor(s) 200. The processor(s) 200 can be a single processing unit or a number of units, all of which could include multiple computing units. The processor(s) 200 may be implemented as one or more microprocessors, microcomputers, microcontrollers, digital signal processors, central processing units, state machines, logic circuitries, and/or any devices that manipulate signals based on operational instructions. Among other capabilities, the processor(s) 200 is configured to fetch and execute computer-readable instructions and data stored in the memory 204.

The functions of the various elements shown in the figure, including any functional blocks labeled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional, and/or custom, may also be included.

The interface(s) 202 may include a variety of software and hardware interfaces, for example, interfaces for peripheral device(s), such as a keyboard, a mouse, an external memory, and a printer. The interface(s) 202 can facilitate multiple communications within a wide variety of networks and protocol types, including wired networks, for example, local area network (LAN), cable, etc., and wireless networks, such as Wireless LAN (WLAN), cellular, or satellite. For the purpose, the interface(s) 202 may include one or more ports for connecting the ICN manager 104 to a number of ICN routers 106 and data sources 108. In various example implementations discussed below, the ICN manager 104 communicates with the ICN routers 106 and the data sources 108 via the interfaces 202.

The memory 204 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The ICN manager 104 also includes modules 206 and data 208.

The modules 206, amongst other things, include routines, programs, objects, components, data structures, etc., which perform particular tasks or implement particular abstract data types. The modules 206, includes the parsing module 112, an identification module 210, and other module(s) 212. The other module(s) 212 may include programs or coded instructions that supplement applications and functions of the ICN manager 104.

On the other hand, the data 208, inter alia serves as a repository for storing data processed, received, and generated by one or more of the modules 206. The data 208 includes, for example, content data 214, entity data 216, and other data 218. The other data 218 includes data generated as a result of the execution of one or more modules in the other module(s) 212.

In an implementation, a request for accessing the content may be sent by the user device 110. The request is received by the ICN router 106 in the O-ICN 102. The ICN router 106 may forward the request to the ICN manager 104 that may be associated with the ICN router 106. The parsing module 112 of the ICN manager 104 may parse the request to determine if the request is an ICN-based request or not. In an example, the parsing module 112 may receive the request from the ICN router 106. If the request is associated with a flag, the request may be understood as an ICN-based request by the parsing module 112. On the other hand, if no flag is associated with the request, the request may be understood as a non-ICN based request. In case of the non-ICN based request, the parsing module 112 may process the request using standard routing mechanisms. For example, the parsing module 112 may send the request back to the ICN router 106 and the ICN router 106 may process the request through standard mechanism of peer-to-peer connection.

In case of an ICN based request, the parsing module 112 may parse the request to determine a name of the content as requested by the user device 110. As may be understood, O-ICN 102 supports requests based on name of the content, the ICN-based request includes a name of the content instead of the location of the content. The receiving module 210 may store the name of the content as the content data 214.

Further, based on the name, the identification module 210 may identify at least one network entity that may be hosting the content as requested by the user device 110. In an example, the identification module 210 may maintain a record of the various network entities and the content being hosted by each of the network entities. The identification module 210 may compare the name with the content stored at the different network entities. In an implementation, the ICN routers 106 may be divided amongst the ICN managers 104. For example, one ICN manager 104 may include records pertaining to a few ICN routers 106 and another ICN manager 104 may include records pertaining to the remaining ICN routers 106. Accordingly, the ICN routers 106 may route the ICN-based requests to the respective ICN managers 104.

In an implementation, each time there is change in the content stored at the ICN routers 106, the corresponding change has to be reported to the respective ICN managers 104. For example, the content may be associated with a lifetime. Once the lifetime expires, the content may no longer be available for accessing. To maintain active content in the cache, the ICN routers 106 may communicate with the data sources 108 to periodically or a-periodically synchronize the content. The synchronized content may be reported back to the respective ICN managers 104.

In an example, to synchronize the cached content, the ICN routers 106 may contact the data sources 108 and retrieve the updated content from the data sources 108. In another example, the ICN routers 106 may drop the expired content. When the ICN routers 106 receive any request from the user device 110, the ICN routers 106 may fetch the content, based on the request, from the data sources 108.

In addition, the identification module 210 may store information pertaining to the network entities as entity data 216. As the ICN routers 106 are patched to cache content, the at least one network entity may include the ICN router 106 and the data source 108. In an example, some part of the requested content may be stored at one network entity, such as the ICN router 106 and the remaining part of the requested content may be stored at another network entity, such as the data source 108.

In an implementation, if the ICN manager 104 is unable to identify a source of the requested content, the ICN manager 104 may communicate with neighboring ICN manager 104 to identify the source of the requested content. In this example, the ICN managers 104 follow a hierarchical structure, i.e., if the ICN manager 104 is not able to resolve the name of the requested content it will contact another ICN manager 104 which is at a higher hierarchical level than the as in traditional DNS servers in the current Internet. The search for the requested content is carried on between the ICN managers 104 till the requested content is found.

Further, upon identifying the at least one network entity, the identification module 210 may send a notification to the at least one network entity to provide the requested content to the user device 110. In an implementation, the identification module 210 may share an Internet Protocol (IP) address of the user device 110 with the at least one identified network entity, for sharing the requested content directly with the user device 110.

Figure 3:
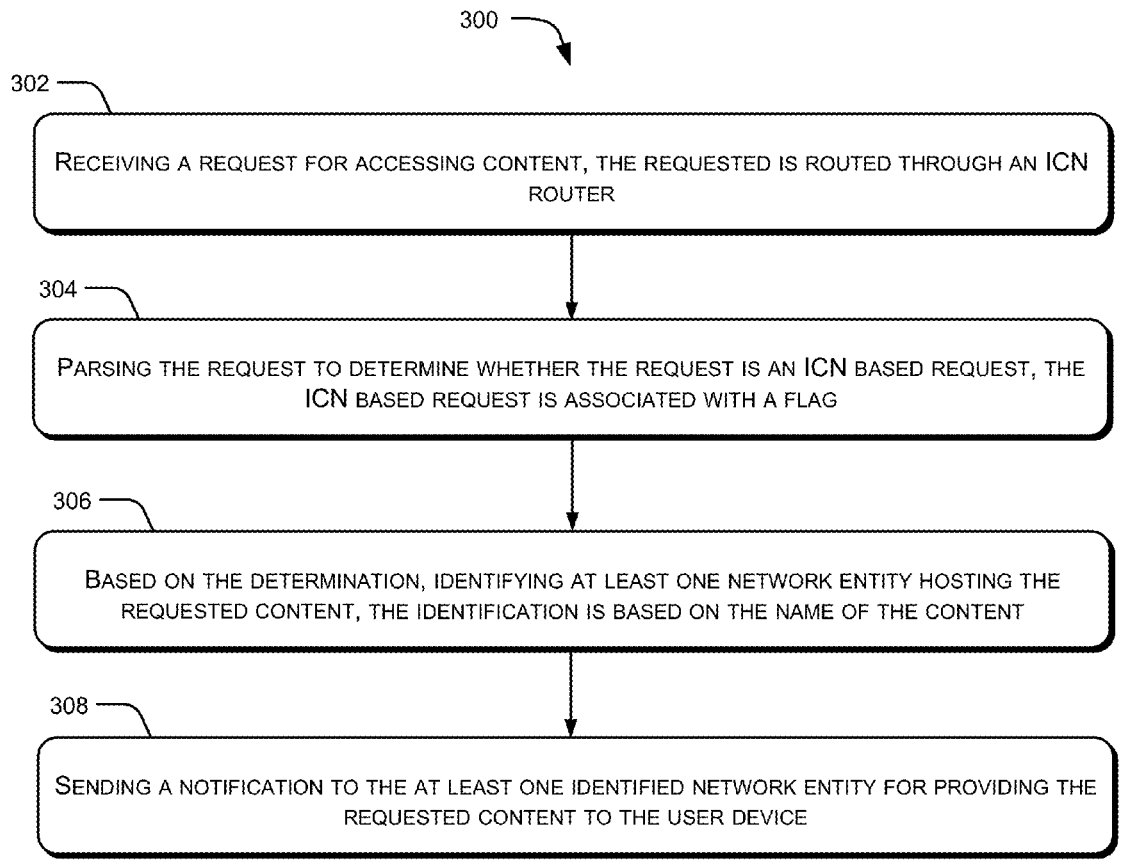
FIG. 3 illustrates a method for providing the requested content to a user device in an Overlay Information Centric Networking (O-ICN) architecture, in accordance with an implementation of the present subject matter.

FIG. 3 illustrates method 300 for providing requested content to a user device in the overlay information centric networking (O-ICN) architecture, in accordance with an implementation of the present subject matter. In an example, the method 300 may be performed by a processing device such as, the ICN manager 104 described earlier.

The method 300 may be described in the general context of computer executable instructions. Generally, computer executable instructions can include routines, programs, objects, components, data structures, procedures, modules, functions, etc., that perform particular functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices.

The order in which the method(s) are described is not intended to be construed as a limitation, and any number of the described method blocks can be combined in any order to implement the method 300, or an alternative method. Additionally, individual blocks may be deleted from the methods without departing from the spirit and scope of the subject matter described herein. Furthermore, the method 300 can be implemented in any suitable hardware, software, firmware, or combination thereof.

In an implementation, one or more of the method(s) described herein may be implemented at least in part as instructions embodied in a non-transitory computer-readable medium and executable by one or more computing devices. In general, a processor (for example a microprocessor) receives instructions, from a non-transitory computer-readable medium, for example, a memory, and executes those instructions, thereby performing one or more method(s), including one or more of the method(s) described herein. Such instructions may be stored and/or transmitted using any of a variety of known computer-readable media.

Referring to FIG. 3, at block 302, the method 300 may include receiving a request for accessing content. In an example, the request is routed through an ICN router 106. In an implementation, the parsing module 112 may receive the request for providing the requested content to the user device 110 from the ICN router 106.

At block 304, the method 300 may include parsing the request to determine whether the request is an ICN based request. The ICN based request is associated with a flag. In an implementation, the parsing module 112 may parse the request to determine whether the request is an ICN based request.

At block 306, the method 300 may include, upon determination, identifying at least one network entity hosting the requested content. The identification is based on the name of the content. In an implementation, the identification module 210 may identify the at least one network entity that may host the requested content. For example, the identification module 210 may maintain a log of the content being hosted by different network entities. The identification module 210 may compare the name of the requested content with each of the network entities to identify the at least one network entity hosting the requested content.

In case, the identification module 210 is unable to identify the network entity hosting the requested content, the identification module 210 may communicate with other ICN managers 104 to identify the network entity that may host the requested content. In one implementation, the ICN manager 104 may communicate with other ICN managers 104 that may be placed at a higher level in the hierarchy to determine a source of the requested content. In another implementation, the ICN manager 104 may communicate with neighboring ICN managers, such as through peer-to-peer connection, to determine the at least one network entity hosting the requested content. In an example, the network entity may be an ICN router 106 or a data store 108, such as an ICN server.

Further, at block 308, the method 300 may include sending a notification to the at least one identified network entity for providing the requested content to the user device 110. In an implementation, the identification module 210 may send the notification to the identified network entities for providing the requested content. In the present implementation, the identification module 210 may share an Internet Protocol (IP) address of the user device 110 with the identified network entities so that the requested content may be directly shared with the user device 110.

Although embodiments for methods and systems for providing requested content in an overlay information centric network (O-ICN) architecture have been described in a language specific to structural features and/or methods, it is to be understood that the invention is not necessarily limited to the specific features or methods described. Rather, the specific features and methods are disclosed as exemplary embodiments for providing requested content in an overlay information centric network (O-ICN) architecture.

We claim:

1. A method for providing requested content to a user device in an overlay information centric networking (O-ICN) architecture, the method comprising:

receiving, by an ICN manager system via a processor, a request for accessing content, from the user device, wherein the request is routed to the ICN manager system from an ICN router, wherein the ICN router is patched to communicate with the ICN manager system, wherein the O-ICN architecture comprises an ICN sub-layer added at a top of a transport layer of a TCP/IP protocol stack, and the O-ICN architecture enables seamless operation in a SDN network and a non-SDN network by means of the ICN sub-layer, and wherein the request comprises an ICN sub-layer header comprising a content name field to indicate a name of the requested content and a flag bit used to indicate that the request is an ICN based request or an ICN based content, and a reserved bit of a TCP header used to indicate that the request is the ICN based request or a non-ICN based request;

parsing, by the ICN manager system via the processor, the request to determine whether the request is the ICN-based request based on at least one of the flag bit of the ICN sub-layer header and the reserved bit of the TCP header;

based on the determination that the request is the ICN based request, identifying, by the ICN manager system via the processor, at least one network entity hosting the requested content by comparing the name of the content with a plurality of network entities, and wherein the ICN manager system maintains a record of the content being hosted by each of the plurality of network entities; and sending, by the ICN manager system via the processor, a notification directly to the at least one identified network entity hosting the requested content for providing the requested content to the user device and directly sharing an Internet Protocol (IP) address of the user device with the at least one network entity for providing the requested content to the user device.

2. The method as claimed in claim 1, wherein the O-ICN architecture is implemented as an overlay network over an Internet, and wherein the O-ICN architecture is implemented incrementally as the overlay network over the Internet without impacting functionalities of the Internet.

3. The method as claimed in claim 1, wherein the at least one network entity is one of the ICN router and an ICN server.

4. The method as claimed in claim 3, wherein the at least one network entity sets a reserved bit of the TCP header to 1 while providing the requested content to the user device.

5. The method as claimed in claim 1 further comprising communicating, by the ICN manager system, with one of a neighboring ICN manager system and other ICN manager system placed at a higher level in the hierarchy, to identify the at least one network entity hosting the requested content.

6. The method as claimed in claim 1, wherein the flag bit is a first bit of the ICN sub-layer header.

7. The method as claimed in claim 1 further comprising routing, by the ICN manager system the request to a network entity based on an Internet Protocol (IP) address of the network entity as mentioned in the request, when the request is a non-ICN based request.

8. The method as claimed in claim 1, wherein the identifying comprises resolving, by the ICN manager system name of the content requested by the user device.

9. An information centric networking (ICN) manager system for providing requested content to a user device in an overlay information centric networking (O-ICN) architecture, the ICN manager system comprising:
a processor;
a memory coupled to the processor, and the processor executes a plurality of modules stored in the memory, wherein the plurality of modules comprises,
a parsing module, coupled to the processor, to,
receive a request from an ICN router for providing the requested content to the user device, wherein the O-ICN architecture comprises an ICN sub-layer added at a top of a transport layer of a TCP/IP protocol stack, and the O-ICN architecture enables seamless operation in a SDN network and a non-SDN network by means of the ICN sub-layer, and wherein the request comprises an ICN sub-layer header comprising a content name field to indicate a name of the requested content and a flag bit used to indicate that the request is an ICN based request or an ICN based content, and a reserved bit of a TCP header used to indicate that the request is the ICN based request or a non-ICN based request;
parse the request to
determine whether the request is the ICN based request based on at least one of the flag bit of the ICN sub-layer header and the reserved bit of the TCP header; and
determine the name of the content as requested by the user device, wherein the user device is capable of sending name based requests;
an identification module, coupled to the processor, to
upon determination, identify at least one network entity hosting the requested content by comparing the name of the content with a plurality of network entities, and wherein the ICN manager system maintains a record of the content being hosted by each of the plurality of network entities; and
based on the identification, send a notification to the at least one network entity for providing the requested content to the user device and sharing an Internet Protocol (IP) address of the user device with the at least one network entity for providing the requested content to the user device.

10. The ICN manager system as claimed in claim 9, wherein the identification module maintains a record of the content being hosted by a plurality of network entities.

11. The ICN manager system as claimed in claim 9, wherein the identification module communicates with one of a neighboring ICN manager and other ICN manager placed at a higher level in the hierarchy to identify the at least one network entity hosting the requested content.

12. A method for generating an information centric networking (ICN) based request for receiving requested content to a user device in an overlay information centric networking (O-ICN) architecture, the method comprising:
determining, by the user device, a name of content for being requested;
generating, by a user device, a request header, wherein the request header comprises a plurality of header fields, wherein the plurality of header fields comprises an ICN content name field to indicate name of the requested content; and
associating, by the user device, a flag with a reserved bit of the request header to indicate that the request is an ICN based request, wherein the O-ICN architecture is implemented as an overlay network over an Internet, and wherein the O-ICN architecture is implemented incrementally as the overlay network over the Internet without impacting functionalities of the Internet, and wherein the O-ICN architecture comprises an ICN sub-layer added at a top of a transport layer of a TCP/IP protocol stack, and the overlay information centric networking (O-ICN) architecture enables seamless operation in a SDN network and a non-SDN network by means of the ICN sub-layer.

13. The method as claimed in claim 12, wherein the ICN content name field is a multiple of 32 bits.

14. The ICN manager system as claimed in claim 9, wherein the O-ICN architecture is implemented as an overlay network over an Internet, and wherein the O-ICN architecture is implemented incrementally as the overlay network over the Internet without impacting functionalities of the Internet.

* * * * *